Figures 1, 2:
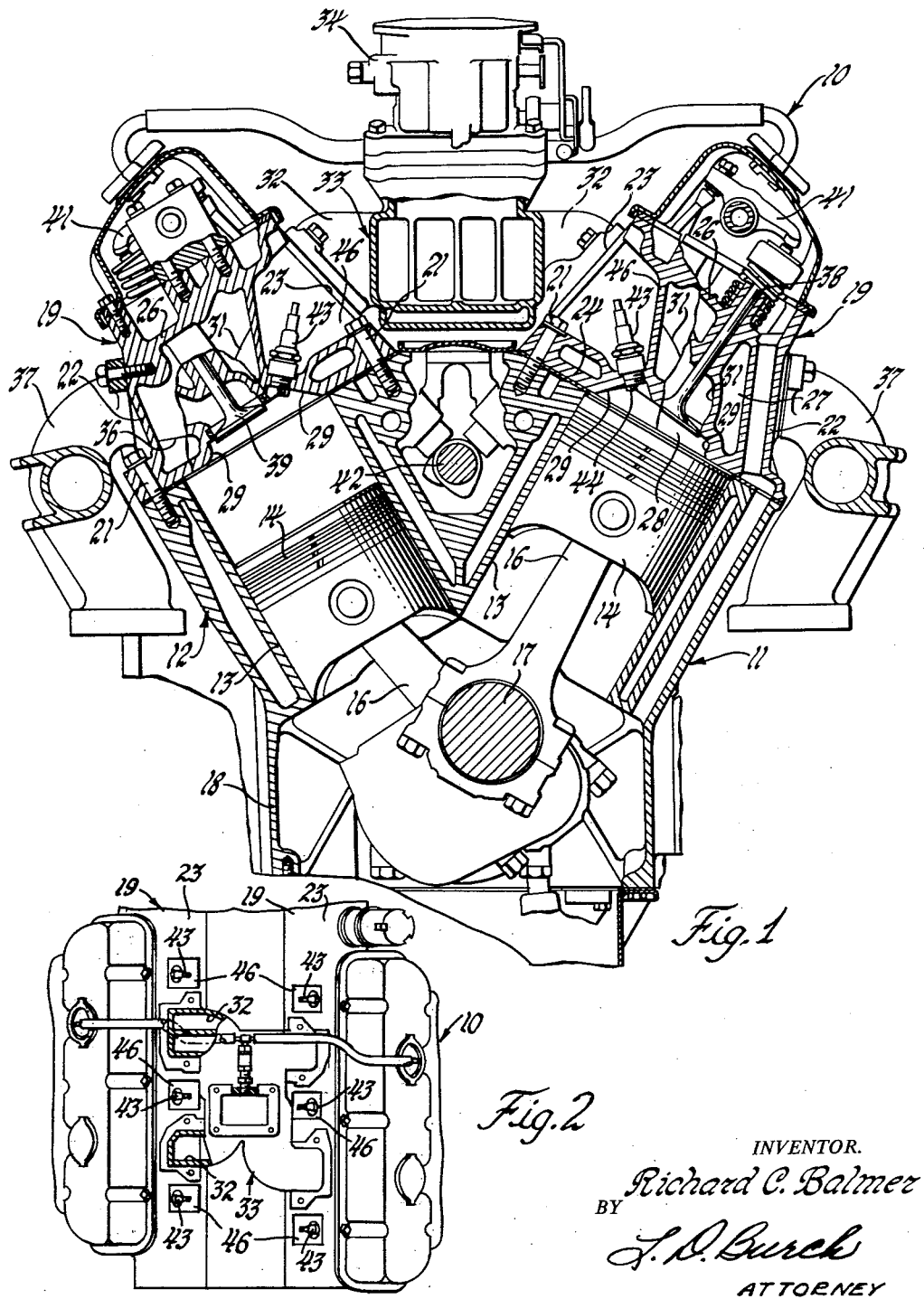

INVENTOR.
Richard C. Balmer
BY
L. D. Burch
ATTORNEY

# United States Patent Office 3,034,491
Patented May 15, 1962

3,034,491
INTERNAL COMBUSTION ENGINE
Richard C. Balmer, Pontiac, Mich., assignor to General Motors Corporation, Detroit, Mich., a corporation of Delaware
Filed Dec. 24, 1959, Ser. No. 861,914
4 Claims. (Cl. 123—55)

This invention relates to internal combustion engines, particularly to the arrangement of spark plugs relative to other hotter and cooler parts of the engine.

It is proposed to dispose the spark plugs of the cylinders in a row of cylinders on the side of the engine opposite the exhaust passages and exhaust manifold of the engine. It is proposed also to so form the combustion chambers that there will be a greater part of the volume thereof on one side and a smaller volume on the other side of each cylinder, the spark plugs being disposed in the engine head in such a way that the terminals thereof will project into the combustion chambers on the sides thereof having the greatest volume. In such construction the inner walls of the firing chambers formed in the heads may slope so that the inlet and exhaust valves for the cylinders will slope outwardly toward the exhaust manifold side of the head. The spark plugs are disposed in cavities formed in the head that are remote from the exhaust passages and the exhaust manifold, the cavities being open on the inlet manifold side to facilitate the cooling of the spark plugs.

FIGURE 1 of the drawing illustrates a cross-sectional view of a 60° V-type six cylinder internal combustion engine embodying the invention.

FIGURE 2 is a top view of the engine with the carburetor removed illustrating the cavities aligned with the inlet passages.

The engine 10 has rows 11 and 12 of cylinders 13 with reciprocating pistons 14 therein that are connected by connecting rods 16 to a crankshaft 17 mounted in the engine block 18. The rows of cylinders have heads 19 that are secured thereto by bolts 21. The heads 19 have outer side walls 22, inner side walls 23, inner walls 24 and outer walls 26, all extending substantially throughout the length of the heads. These and other walls may form cooling cavities 27 if desired. Combustion chambers 28 are formed for each cylinder 13 between the adjacent walls of the heads, the cylinders and the pistons. The combustion chambers 28 include firing chambers 29 that may be so formed in the heads that the larger parts of the combustion chambers in each row are on one side of the cylinder, the smaller parts being on the other side of the cylinders. In the present instance the larger sides of the firing chamber are on adjacent sides of the heads, the smaller parts being on the remote sides of the heads. Inlet passages 31 are formed in the heads in such a way that the inlet ends of the passages open through the inner walls 23 and the outlet ends terminate in the inner walls 24 of the heads and communicate therethrough with the firing chambers 29. The inlet ends of the inlet passages 31 are adapted to be supplied with combustible mixture through the outlet passages 32 of an inlet manifold such as that indicated at 33. A carburetor 34 may be employed if desired for supplying the combustible mixture to the manifold 33. Exhaust passages 36 are also formed in the heads 19 with the outlet ends thereof terminating in the outer walls 22 and the inner ends terminating in the inner walls 24 of the heads and communicating therethrough with the firing chambers 29. The outer ends of the exhaust passages 36 communicate with exhaust manifolds 37 on the remote sides of the heads 19. Inlet valves 38 control the outlet ends of the inlet passages 31 and are seated in openings in the inner walls 24. Exhaust valves control the inlet ends of the exhaust passages 36 and are likewise seated in openings in the inner walls 24. The valves 38 and 39 are disposed in rows throughout the length of the rows of cylinders 11 and 12 and diverge outwardly at the outer ends of the stems thereof from planes through the axes of the cylinders in each row of cylinders of the engine. Valve actuating mechanisms 41 operate the valves 38 and 39 in response to the rotation of the camshaft 42 of the engine. Spark plugs 43 are secured in openings in the inner walls 24 with the terminals 44 projecting into the firing chambers 29 on the adjacent sides of the cylinders in each row of cylinders 13 where the firing chambers have the greatest volume. The spark plugs are located in cavities 46 which are formed in the heads 19, the inner ends of the cavities terminating in the inner walls 24, the outer ends terminating in the adjacent side walls 23.

The walls of the head forming the cavities 46 are in heat conducting relation to the inner walls 24 on the sides of the head remote from the exhaust passages 36 and the exhaust manifolds 37, and are in heat conducting relation to the inner side walls 23 and to the walls forming the inlet passages 31 in the heads. The walls forming the cavities 46 diverge outwardly to provide enlarged outer ends of the cavities which terminate in openings in the inner side walls 23. The enlarged open ends of the cavities 46 expose the spark plugs to convection currents of air on the adjacent sides of the heads and that circulate around the relatively cold inlet manifold 33. The spark plugs 43 in the cavities are exposed to radiation of heat to the walls forming the cavities and to adjacent parts of the walls of inlet manifold 33.

The claims:
1. An internal combustion engine having a row of cylinders having pistons therein and having a head for said cylinders and having combustion chambers between said head and said pistons and said cylinders, inlet and exhaust valves in said head for each of said cylinders, inlet and exhaust passages in said head and extending in opposite directions in said head and terminating in opposite side walls of said head, an inlet manifold on one side of said head and connected to said inlet passages, an exhaust manifold on the other side of said head and connected to said exhaust passages, cavities for said cylinders and formed in said head on said one side of said head and aligned with said inlet passages and extending through said head to the inner wall of said head, and spark plugs disposed in said cavities and secured in said inner wall and having the terminals thereof extending into said combustion chambers, said spark plugs being accessible through said cavities from said one side of said head and being disposed in said head in remote relation to said exhaust passages and said exhaust manifold and being cooled by conduction of heat to said head and said intake passages and by convection currents in the air on said one side of said head and by radiation of heat to said head and said inlet manifold.

2. An internal combustion engine having a row of cylinders having pistons therein and having a head for said cylinders and having combustion chambers between said head and said pistons and said cylinders, said combustion chambers being larger on one side than on the other side of said head and being formed to provide larger squish areas on said other side than on said one side of said head, inlet and exhaust valves in said head for each of said cylinders, inlet and exhaust passages in said head and extending in opposite directions in said head and terminating in opposite side walls of said head, an inlet manifold on said one side of said head and connected to said inlet passages, an exhaust manifold on said other sides of said head and connected to said exhaust passages, cavities for said cylinders and formed in said head on said one side of said head and aligned with said inlet passages and extending through said head toward the larger sides of said combustion chambers and to the inner wall of said head, and spark plugs disposed in said cavities and secured in said inner wall and having the terminals thereof extending into said larger sides of said combustion chambers, said spark plugs being accessible through said cavities from said one side of said head and being disposed in said head in remote relation to said exhaust passages and said exhaust manifold and being cooled by conduction of heat to said head and said intake passages and by convection currents in the air on said one side of said head and by radiation of heat to said head and said inlet manifold.

3. An internal combustion engine having oppositely disposed rows of cylinders having pistons therein and having heads for said cylinders and having combustion chambers between said heads and said pistons and said cylinders, inlet and exhaust valves in said heads for each of said cylinders, inlet and exhaust passages in said heads and extending in opposite directions in said heads and terminating in opposite side walls of said heads, an inlet manifold on the adjacent sides of said heads and connected to said inlet passages, exhaust manifolds on the remote sides of said heads and connected to said exhaust passages, cavities for said cylinders and formed in said heads and aligned with said inlet passages and opening through said side walls on said adjacent sides of said heads and extending through said heads to the inner walls of said heads, and spark plugs disposed in said cavities and secured in said inner walls and having the terminals thereof extending into said combustion chambers, said spark plugs being accessible through said cavities from said adjacent sides of said heads and being disposed in said heads in remote relation to said exhaust passages and said exhaust manifolds and being cooled by conduction of heat to said heads and said intake passages and by convection currents in the air on said adjacent sides of said heads and by radiation of heat to said heads and said inlet manifold.

4. An internal combustion engine having oppositely disposed rows of cylinders having pistons therein and having heads for said cylinders and having combustion chambers between said heads and said pistons and said cylinders, said combustion chambers being larger on the adjacent sides than on the remote sides of said heads and being formed to provide larger squish areas on said remote sides than on said adjacent sides of said heads, inlet and exhaust valves in said heads for each of said cylinders, inlet and exhaust passages in said heads and extending in opposite directions in said heads and terminating in opposite side walls of said heads, an inlet manifold on said adjacent sides of said heads and connected to said inlet passages, exhaust manifolds on said remote sides of said heads and connected to said exhaust passages, cavities for said cylinders and formed in said heads and aligned with said inlet passages and opening through said side walls on said adjacent sides of said heads and extending through said heads toward the larger sides of said combustion chambers and to the inner walls of said heads, and spark plugs disposed in said cavities and secured in said inner walls and having the terminals thereof extending into said larger sides of said combustion chambers, said spark plugs being accessible through said cavities from said adjacent sides of said heads and being disposed in said heads in remote relation to said exhaust passages and said exhaust manifolds and being cooled by conduction of heat to said heads and said intake passages and by convection currents in the air on said adjacent sides of said heads and by radiation of heat to said heads and said inlet manifold.

References Cited in the file of this patent
UNITED STATES PATENTS

| | | |
|---|---|---|
| 1,132,256 | Gunn | Mar. 16, 1915 |
| 1,250,426 | Brush | Dec. 18, 1917 |
| 2,669,227 | Drinkard | Feb. 16, 1954 |
| 2,759,463 | Platner | Aug. 21, 1956 |
| 2,915,050 | Allred | Dec. 1, 1959 |

FOREIGN PATENTS

| | | |
|---|---|---|
| 466,677 | Great Britain | June 2, 1937 |
| 456,688 | Great Britain | Nov. 13, 1936 |